US011204496B2

(12) United States Patent
Grandclerc et al.

(10) Patent No.: US 11,204,496 B2
(45) Date of Patent: Dec. 21, 2021

(54) IMAGE GENERATING DEVICE AND HEAD-UP DISPLAY

(71) Applicant: VALEO COMFORT AND DRIVING ASSISTANCE, Créteil (FR)

(72) Inventors: François Grandclerc, Créteil (FR); Pierre Mermillod, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 375 days.

(21) Appl. No.: 16/319,645

(22) PCT Filed: Jul. 20, 2017

(86) PCT No.: PCT/EP2017/068387
§ 371 (c)(1),
(2) Date: Jan. 22, 2019

(87) PCT Pub. No.: WO2018/015501
PCT Pub. Date: Jan. 25, 2018

(65) Prior Publication Data
US 2021/0141218 A1    May 13, 2021

(30) Foreign Application Priority Data
Jul. 22, 2016    (FR) ...................................... 1657045

(51) Int. Cl.
*G02F 1/1335*    (2006.01)
*G02B 27/01*    (2006.01)
*G02F 1/13357*    (2006.01)

(52) U.S. Cl.
CPC .... *G02B 27/0101* (2013.01); *G02F 1/133531* (2021.01); *G02F 1/133536* (2013.01); *G02F 1/133606* (2013.01)

(58) Field of Classification Search
CPC .................................................. G02B 27/0101
See application file for complete search history.

(56) References Cited

U.S. PATENT DOCUMENTS

| 5,709,463 A | 1/1998 | Igram |
| 2005/0157224 A1* | 7/2005 | Kanbe ............... G02F 1/133536 349/96 |

(Continued)

FOREIGN PATENT DOCUMENTS

| JP | 2000028957 A | 1/2000 |
| JP | 2000131682 A | 5/2000 |

(Continued)

OTHER PUBLICATIONS

International Search Report and Written Opinion Issued in Corresponding PCT Application No. PCT/EP2017/068387, dated Nov. 7, 2017 (20 Pages with English Translation of International Search Report and Written Opinion).

*Primary Examiner* — Edmond C Lau
(74) *Attorney, Agent, or Firm* — Osha Bergman Watanabe & Burton LLP

(57) ABSTRACT

An image generating device (3) comprises a liquid-crystal screen (8) and a light source (5). The liquid-crystal screen (8) comprises a matrix of liquid crystals interposed between an input polariser and an output polariser. The image generating device (3) comprises a first additional polariser (16) located on the light path, upstream of said liquid-crystal screen (8), and a second additional polariser (18) located on the light path, downstream of said liquid-crystal screen (8). The invention also relates to a head-up display (1) comprising a device (3) of this type.

12 Claims, 1 Drawing Sheet

(56) References Cited

U.S. PATENT DOCUMENTS

2013/0279016 A1 10/2013 Finger
2016/0299341 A1* 10/2016 Yoshida ............ G02F 1/134309

FOREIGN PATENT DOCUMENTS

| WO | 2015093077 A1 | 6/2015 |
| WO | 2015122491 A1 | 8/2015 |
| WO | 2016079457 A1 | 5/2016 |

* cited by examiner

IMAGE GENERATING DEVICE AND HEAD-UP DISPLAY

TECHNICAL FIELD TO WHICH THE INVENTION RELATES

The present invention relates to display systems, in particular for vehicles.

It more particularly relates to an image-generating device and head-up display.

The invention is particularly advantageously applicable in the case where it is desired to obtain a particularly bright image without however causing excessive heating within the device.

TECHNOLOGICAL BACKGROUND

Image-generating devices comprising a liquid-crystal display and a light source that is optically associated with the liquid-crystal display, in order to illuminate said display, are used, in particular in vehicle head-up displays.

Such a liquid-crystal display generally comprises a matrix array of liquid crystals that is interposed between an entrance polarizer and an exit polarizer.

In order to allow light rays to pass only in regions chosen by the activation of elements of the matrix array of liquid crystals, a first absorptive polarizer, suitable for selectively transmitting a component of the light having a given entrance polarization, is used as entrance polarizer, and a second absorptive polarizer, suitable for selectively transmitting a component of the light having a given exit polarization (generally orthogonal to the entrance polarization), is used as exit polarizer.

The use of such absorptive polarizers however leads to heating of the device, whether this be in the entrance polarizer (because of the absorption of some of the light emitted by the light source) or in the exit polarizer (because of the absorption of light rays received from outside the device, for example when solar radiation is incident on the system).

SUBJECT OF THE INVENTION

In this context, the present invention proposes an image-generating device comprising a liquid-crystal display and a light source that is optically associated with the liquid-crystal display in order to illuminate said display, the liquid-crystal display comprising a matrix array of liquid crystals that is interposed between an entrance polarizer and an exit polarizer, the entrance polarizer being a first absorptive polarizer suitable for selectively transmitting a component of the light having a given entrance polarization, the exit polarizer being a second absorptive polarizer suitable for selectively transmitting a component of the light having a given exit polarization, said image-generating device including a first additional polarizer located on the path of the light, upstream of said liquid-crystal display, and a second additional polarizer located on the path of the light, downstream of said liquid-crystal display, the first additional polarizer being a first reflective polarizer suitable for reflecting a component of the light having a polarization orthogonal to said entrance polarization and the second additional polarizer being a second reflective polarizer suitable for reflecting a component of the light having a polarization orthogonal to said exit polarization.

Thus, on each side of the liquid-crystal display, some of the light is reflected by the additional polarizers before reaching the absorptive polarizers of the display, this limiting heating of the image-generating device via the display.

According to other envisionable optional (and therefore nonlimiting) features:

the image-generating device comprises an intermediate optical part, such as a diffuser, interposed between the light source and the liquid-crystal display;

the first additional polarizer is placed between the liquid-crystal display and the intermediate optical part (for example between the liquid-crystal display and the aforementioned diffuser);

the image-generating device comprises a reflector extending between the light source and the intermediate optical part;

the first additional polarizer is placed on the intermediate optical part (the first additional polarizer possibly for example being deposited, optionally via a laminating process, on the intermediate optical part);

the first additional polarizer is placed on the liquid-crystal display;

the first additional polarizer is deposited on the entrance polarizer (for example by means of a laminating process).

The invention also proposes a head-up display comprising an image-generating device such as presented above, and an image-projecting device suitable for transmitting in the direction of a partially transparent plate the images generated by the image-generating device.

In embodiments described below, the projecting device comprises a mirror. Provision may then be made for a holder for bearing the liquid-crystal display and the mirror.

The second additional polarizer may in practice be mounted in the holder, for example in a window formed in the holder for the passage of the light transmitted by the liquid-crystal display.

Such a holder may have an aperture for passage of the light reflected by the mirror in the direction of the partially transparent plate.

The second additional polarizer may then be located in said aperture. The second additional polarizer may then close this aperture or be deposited on a transparent partition closing this aperture.

DETAILED DESCRIPTION OF ONE EXAMPLE EMBODIMENT

The following description, which is given with reference to the appended drawings, which are given by way of nonlimiting example, will allow what the invention consists of and how it may be carried out to be clearly understood.

Figure 1:
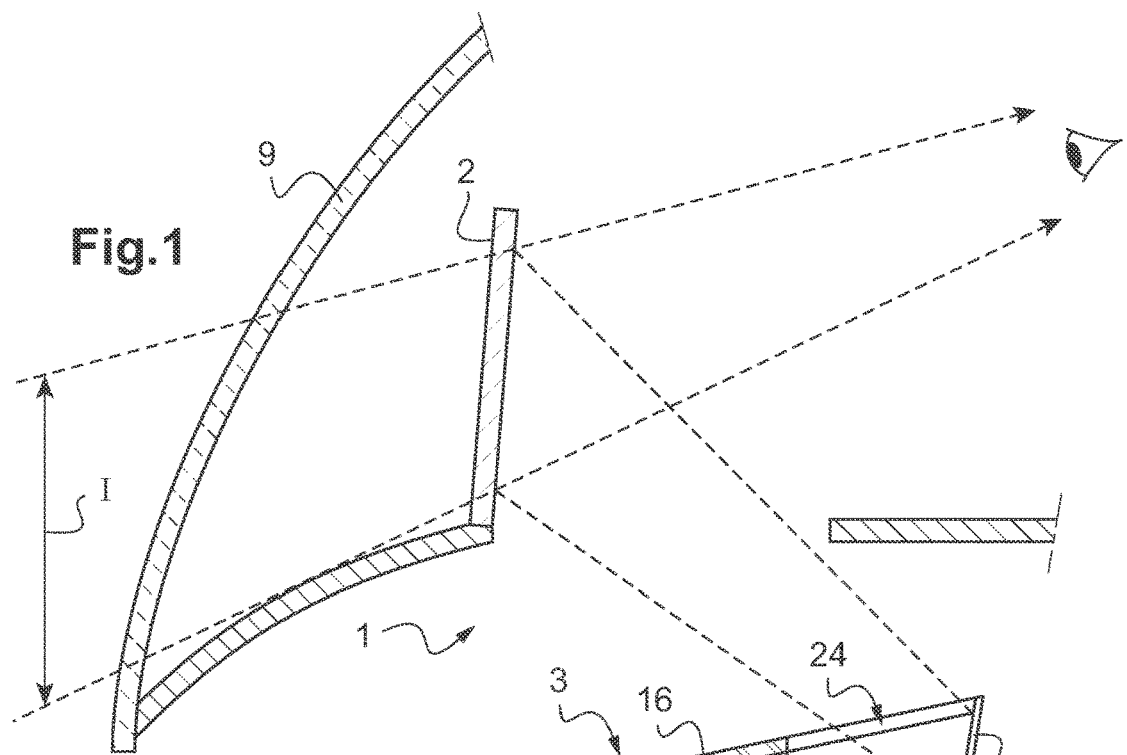
FIG. 1 shows the main elements of a head-up display.

FIG. 1 schematically shows the main elements of a head-up display 1 with which a vehicle, for example a motor vehicle, is intended to be equipped.

Such a display 1 is suitable for creating a virtual image I in the field of vision of a driver of the vehicle, so that the driver can see this virtual image I and any information that it contains without having to divert his/her gaze.

To this end, the display 1 comprises a partially transparent plate 2 placed in the field of vision of the driver, an image-generating device 3 suitable for generating images and an image-projecting device 4 suitable for steering, in the direction of said partially transparent plate 2, the images generated by the image-generating device 3.

More precisely, the partially transparent plate 2 is here a combiner 2, i.e. a partially transparent plate dedicated to the head-up display 1.

Such a combiner 2 is here placed between the windshield 9 of the vehicle and the eyes of the driver.

As a variant, the partially transparent plate could be the windshield of the vehicle. In other words, in this variant, it is the windshield of the vehicle that performs the function of semitransparent plate for the head-up display.

The image-projecting device comprises a folding mirror 4 arranged so as to reflect the images generated by the image-generating device 3 in the direction of the partially transparent plate 2. Here, said folding mirror is a planar mirror.

As a variant, the image-projecting device could comprise a plurality of mirrors and/or other optical elements such as a lens, for example.

The image-generating device 3 comprises for its part at least one light source 5, one reflector 6, one diffuser 7 that receives the light emitted by the light source 5 (optionally after reflection from the reflector 5) and a display 8 that receives the light transmitted by the diffuser 7.

The light source 5 comprises at least one light-emitting diode (or LED), and in general a plurality of such light-emitting diodes.

The reflector 6 extends between the light source 5 and the diffuser 7, and at least partially encircles the main emission axis of the light source 5.

The diffuser 7 spreads the light flux generated by the assembly consisting of the light source 5 and the reflector 6 angularly. In practice, such a diffuser 7 may for example be produced by means of a film having a smooth face (which is for example turned toward the display 8) and a grained opposite face (which is here turned toward the light source 5) that causes the scatter of light.

The display 8 is a liquid-crystal display (or LCD), here a thin-film-transistor (or TFT) liquid-crystal display.

Figure 2:
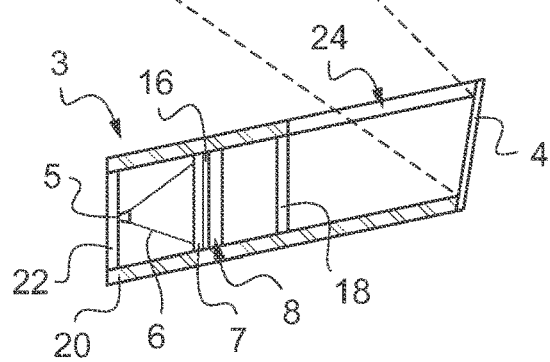
FIG. 2 shows elements of an image-generating device used in the head-up display of FIG. 1.
Figure 2:
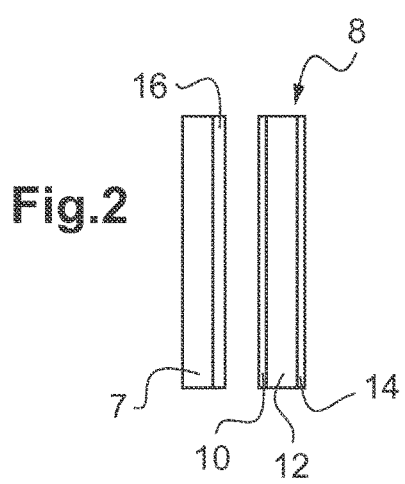

As schematically shown in FIG. 2, such a display 8 comprises an entrance polarizer 10, a matrix array of liquid crystals 12 and an exit polarizer 14 (the matrix array of liquid crystals 12 being interposed between the entrance polarizer 10 and the exit polarizer 14).

The entrance polarizer 10 is an absorptive polarizer suitable for selectively transmitting a component of the light having a given entrance polarization (for example p-polarization); the exit polarizer 14 is for its part an absorptive polarizer suitable for selectively transmitting a component of the light having a given exit polarization (for example s-polarization), which is generally orthogonal (i.e. perpendicular) to the entrance polarization.

Thus, if no element of the matrix array of liquid crystals 12 is activated, the light beam between the entrance polarizer 10 and the exit polarizer 14 will have the aforementioned entrance polarization and no light will therefore be emitted as output from the exit polarizer 14.

By suitable activation of certain elements of the matrix array of liquid crystals 12, the polarization of corresponding portions of the light beam is modified so that light is emitted as output from the exit polarizer 14 in the regions corresponding to these portions of the light beam.

The image-generating device 3 also comprises a first additional polarizer 16 located on the path of the light, upstream of said liquid-crystal display 8.

The first additional polarizer 16 is a reflective polarizer suitable for reflecting a component of the light having a polarization orthogonal to the aforementioned entrance polarization.

In the embodiment of FIGS. 1 and 2, the first additional polarizer 16 is borne by the diffuser 7, here on that face of the diffuser 7 which is turned toward the display 8. The first additional polarizer 16 is for example laminated onto the diffuser 7. As a variant, the first additional polarizer 16 could be placed on the diffuser 7

In the figures, the assembly consisting of the diffuser 7 and the first additional polarizer 16 is located at a (small) distance from the display 8 (for the sake of clearness of the representation). This assembly consisting of the diffuser 7 and first additional polarizer 16 may however in practice be placed in contact with the display 8 (the first additional polarizer 16 making in the present case contact with the display 8).

The first additional polarizer 16 thus allows components of the light having a polarization that is orthogonal to the entrance polarization to be reflected toward the diffuser 7 then the reflector 6, this making it possible to prevent these components from being absorbed by the entrance polarizer 10 and then causing heating of the display 8.

In contrast, the first additional polarizer 16 transmits the component of the light having the aforementioned entrance polarization, which component is useful for illuminating the display 8.

The components reflected by the first additional polarizer 16 toward the reflector 6 moreover undergo (at least partially) a modification of their polarization as they pass through the diffuser 7 so that they may, in the end, be transmitted through the first additional polarizer 16 and thus participate in the illumination of the display 8.

The image-generating device 3 furthermore comprises a second additional polarizer 18 that is located on the path of the light, downstream of said liquid-crystal display 8.

Figure 3:
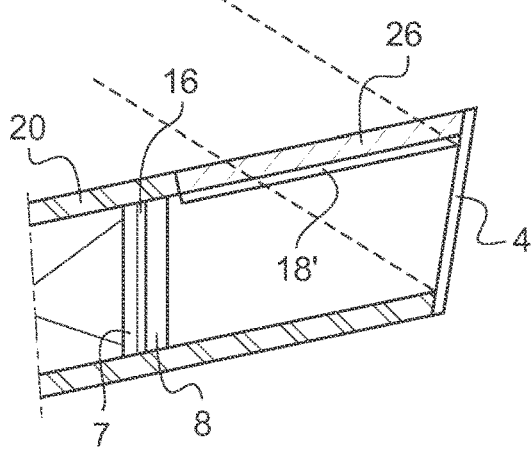
FIG. 3 shows an alternative embodiment.

The second additional polarizer 18 is here placed between the display 8 and the folding mirror 4. As a variant, as shown in FIG. 3 and explained below, the second additional polarizer (reference 18' in FIG. 3) could be located between the folding mirror 4 and the partially transparent plate 2.

The second additional polarizer 18 is a reflective polarizer suitable for reflecting a component of the light having a polarization that is orthogonal to the aforementioned exit polarization.

Thus, light radiation received from outside the head-up display 1 (typically thus solar radiation) and reflected toward the image-generating device 3 by the folding mirror 4 will be partially reflected by the second additional polarizer 18, this limiting any heating of the display 8 due to such outside light radiation.

The second additional polarizer 18 in contrast transmits the component of the light having the aforementioned exit polarization and hence the light emitted as output from the display (which has this exit polarization because of use of the exit polarizer 14) is integrally transmitted by the second additional polarizer 18.

As may be seen in FIG. 1, the image-generating device 3 is here accommodated in a holder 20.

More precisely, the holder 20 bears a printed circuit board 22 (on which the light source 5 is mounted), the assembly consisting of the diffuser 7 and the first additional polarizer 16, the display 8 and the folding mirror 4.

In the example described here, the holder 20 furthermore bears the second additional polarizer 18. Provision may moreover be made for the second additional polarizer 18 to be mounted in the holder 20 so as to close a window for passage of the light, provided in the holder 20 downstream of the display 8 (in the direction of travel of the light), as may be seen in FIG. 1. The display 8 is thus accommodated in a closed enclosure formed by the printed circuit board 22, the holder 20 and the second additional polarizer 18.

An aperture 24 is produced in the holder 20 so as to allow the light reflected by the folding mirror 4 in the direction of the partially transparent plate 2 to pass.

In one alternative embodiment shown in FIG. 3, the aforementioned aperture is closed by a translucent partition 26 (which is for example made of polycarbonate). In the variant mentioned above in which the second additional polarizer 18' is located between the folding mirror 4 and the partially transparent plate 2, the second additional polarizer 18' may be located on this translucent partition 26. The second additional polarizer 18' may for example be deposited on the internal face (i.e. the face turned toward the folding mirror 4) of the translucent partition 26 in order to protect said polarizer from outside aggressions.

As a variant, the second additional polarizer 18' could itself close the aperture in the holder 20 (the translucent partition then possibly being omitted).

According to yet another variant, the second additional polarizer could be deposited (for example using a laminating process, with optional interposition of a transparent adhesive) on the exit face of the display 8 (i.e. the face turned toward the folding mirror 4), and more precisely on the exit polarizer 14.

Figure 4:
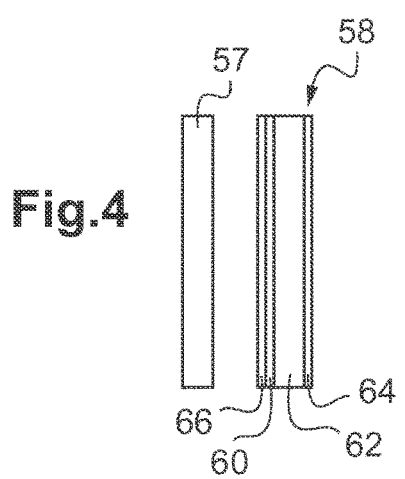
FIG. 4 shows one variant embodiment envisionable for the elements of FIG. 2.

FIG. 4 shows a variant embodiment that is envisionable for the elements of FIG. 2.

The elements of the image-generating device that are not shown in FIG. 4 are identical to the elements shown in FIG. 1 and will therefore not be described again.

In the variant in FIG. 4, the image-generating device here once more comprises a diffuser 57 and a display 58.

The display 58 comprises, as in the case of FIG. 2, an entrance polarizer 60, a matrix array of liquid crystals 62 and an exit polarizer 64.

As for the embodiment of FIG. 2, the entrance polarizer 60 is an absorptive polarizer suitable for selectively transmitting a component of the light having a given entrance polarization and the exit polarizer 64 is an absorptive polarizer suitable for selectively transmitting a component of the light having a given exit polarization, which is generally orthogonal (i.e. perpendicular) to the entrance polarization.

The image-generating device comprises a first additional polarizer 66, which is here borne by the display 58, and more precisely by the entrance face of the display 8 (i.e. the face located facing the diffuser 7).

The first additional polarizer 66 is a reflective polarizer suitable for reflecting a component of the light having a polarization that is orthogonal to the aforementioned entrance polarization and for transmitting a component of the light having this entrance polarization.

The first additional polarizer 66 is for example laminated (i.e. deposited by a laminating process, allowing deposition without creating air bubbles) on the entrance polarizer 16 of the display 58, optionally with interposition of a transparent adhesive.

As already implicitly indicated, the image-generating device here also comprises a second additional polarizer (not shown) of the same type as the second additional polarizer 18 described above with reference to FIGS. 1 and 2.

In the preceding examples, the first additional polarizer 16, 66 is born either by the diffuser 7, or by the display 58.

Provision could be made, as a variant, for the first additional polarizer 16, 66 to be located between the diffuser and the liquid-crystal display, at a distance from the diffuser and at a distance from the liquid-crystal display.

The invention claimed is:

1. An image-generating device comprising:
    a liquid-crystal display;
    a light source that is optically associated with the liquid-crystal display in order to illuminate the liquid-crystal display, the liquid-crystal display comprising a matrix array of liquid crystals that is interposed between an entrance polarizer and an exit polarizer,
        the entrance polarizer being a first absorptive polarizer for selectively transmitting a component of the light having a given entrance polarization, the exit polarizer being a second absorptive polarizer for selectively transmitting a component of the light having a given exit polarization;
    a first additional polarizer located on the path of the light, upstream of the liquid-crystal display, wherein the entrance polarizer is between the first additional polarizer and the liquid-crystal display;
    a second additional polarizer located on the path of the light, downstream of the liquid-crystal display, wherein the exit polarizer is between the second additional polarizer and the liquid-crystal display,
    wherein the first additional polarizer is a first reflective polarizer for reflecting a component of the light having a polarization orthogonal to the entrance polarization, and the second additional polarizer is a second reflective polarizer for reflecting a component of the light having a polarization orthogonal to the exit polarization.

2. The image-generating as claimed in claim 1, further comprising an intermediate optical part interposed between the light source and the liquid-crystal display.

3. The image-generating device as claimed in claim 2, wherein the intermediate optical part is a diffuser.

4. The image-generating device as claimed in claim 2, wherein the first additional polarizer is placed between the liquid-crystal display and the intermediate optical part.

5. The image-generating device as claimed in claim 2, further comprising a reflector extending between the light source and the intermediate optical part.

6. The image-generating device as claimed in claim 2, wherein the first additional polarizer is placed on the intermediate optical part.

7. The image-generating device as claimed in claim 1, wherein the first additional polarizer is placed on the liquid-crystal display.

8. The image-generating device as claimed in claim 7, wherein the first additional polarizer is deposited on the entrance polarizer.

9. A head-up display comprising:
    an image-generating device comprising:
        a liquid-crystal display,
        a light source that is optically associated with the liquid-crystal display in order to illuminate the liquid-crystal display, the liquid-crystal display comprising a matrix array of liquid crystals that is interposed between an entrance polarizer and an exit polarizer,
            the entrance polarizer being a first absorptive polarizer for selectively transmitting a component of the light having a given entrance polarization, the exit polarizer being a second absorptive polarizer for selectively transmitting a component of the light having a given exit polarization, a first additional polarizer located on the path of the light, upstream of said liquid-crystal display, wherein the entrance polarizer is between the first additional polarizer and the liquid-crystal display, a second additional polarizer located on the path of the light, downstream of said liquid-crystal display, wherein the exit polarizer is between the second additional polarizer and the liquid-crystal display, wherein the first additional polarizer is a first reflective polarizer for reflecting a component of the light having a polarization orthogonal to the entrance polarization, and the second additional polarizer is a second reflective polarizer for reflecting a component of the light having a polarization orthogonal to the exit polarization; and an image-projecting device for transmitting in a direction of a partially transparent plate images generated by the image-generating device.

10. The head-up display as claimed in claim 9, wherein the projecting device comprises a mirror and wherein a holder bears the liquid-crystal display and the mirror.

11. The head-up display as claimed in claim 10, wherein the second additional polarizer is mounted in the holder.

12. The head-up display as claimed in claim 10, wherein the holder has an aperture for passage of the light reflected by the mirror in the direction of the partially transparent plate and wherein the second additional polarizer is located in said aperture.

* * * * *